(No Model.)
W. R. PHILLIPS.
MACHINE FOR ASSORTING FRUIT.
No. 376,904. Patented Jan. 24, 1888.
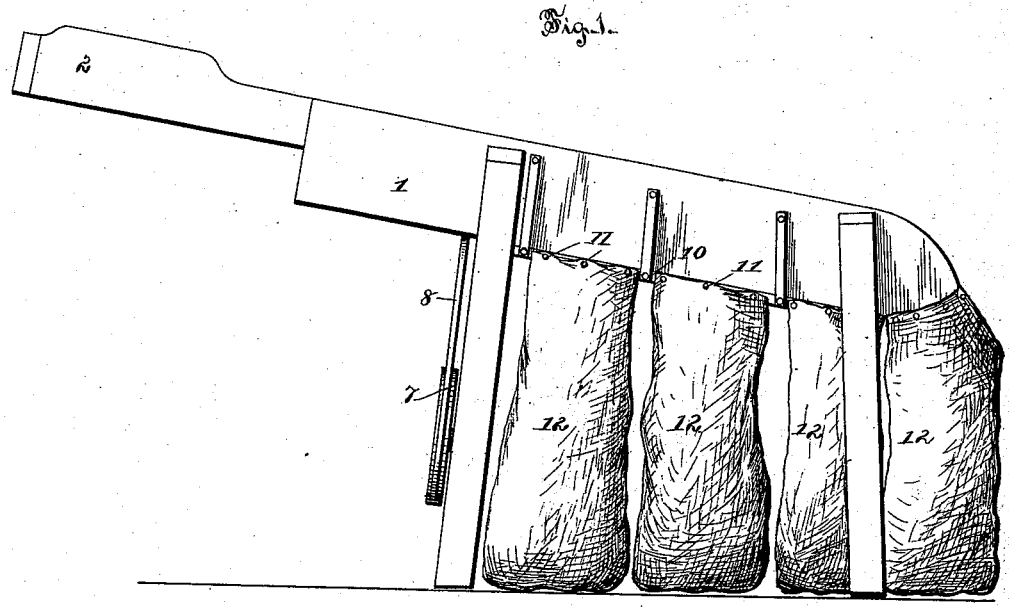
WITNESSES
F. L. Ourand
A. L. Morsell
INVENTOR
William R. Phillips,
By
Louis Bagger & Co
Attorneys (No Model.) 2 Sheets—Sheet 2.

W. R. PHILLIPS.
MACHINE FOR ASSORTING FRUIT.

No. 376,904. Patented Jan. 24, 1888.

WITNESSES
F. L. Ourand
A. L. Morsell

INVENTOR
William R. Phillips
By Louis Bagger & Co.
Attorneys

UNITED STATES PATENT OFFICE.

WILLIAM R. PHILLIPS, OF MILFORD, DELAWARE.

MACHINE FOR ASSORTING FRUIT.

SPECIFICATION forming part of Letters Patent No. 376,904, dated January 24, 1888.

Application filed September 10, 1886. Serial No. 213,230. (No model.)

*To all whom it may concern:*

Be it known that I, WILLIAM R. PHILLIPS, of Milford, in the county of Kent and State of Delaware, have invented certain new and useful Improvements in Machines for Assorting Fruit; and I do hereby declare that the following is a full, clear, and exact description of the invention, which will enable others skilled in the art to which it appertains to make and use the same, reference being had to the accompanying drawings, which form a part of this specification, and in which—

Figure 3:
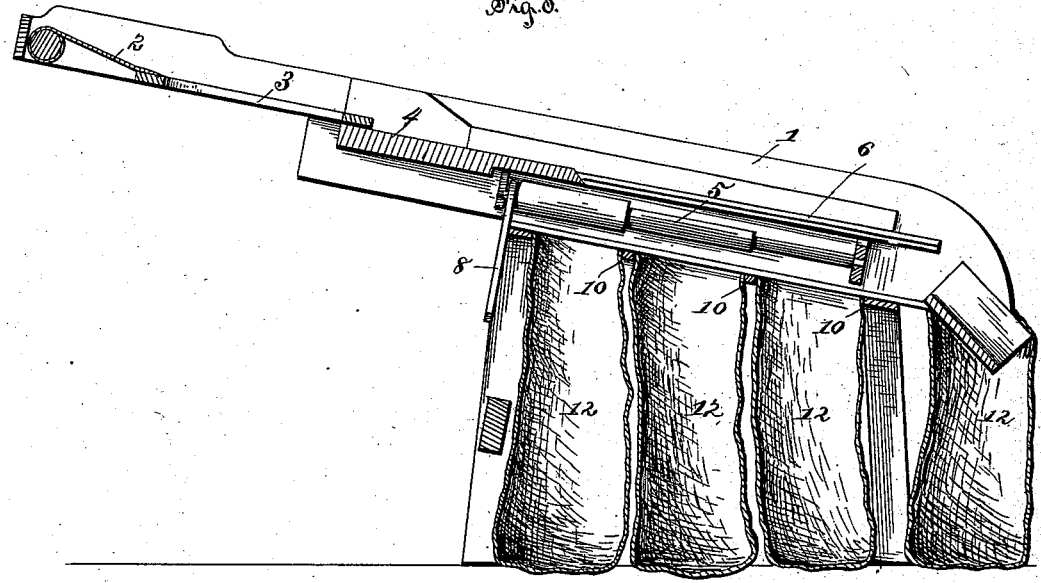
Figure 4:
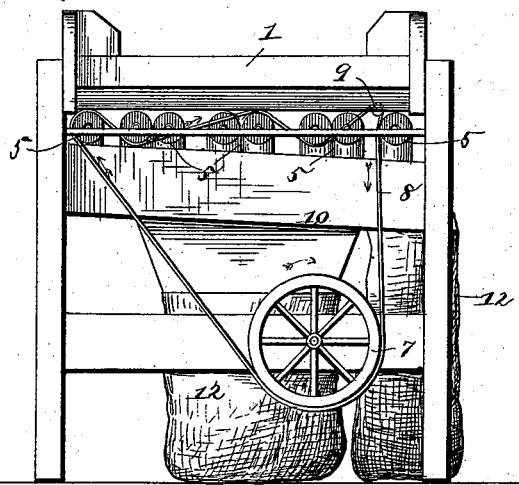

Figure 1 is a side view of my improved machine for assorting fruit. Fig. 2 is a top view of the same. Fig. 3 is a longitudinal vertical sectional view on line $x$ $x$, Fig. 2; and Fig. 4 is an end view seen from the receiving end.

Similar numerals of reference indicate corresponding parts in all the figures.

My invention has relation to that class of machines for separating and assorting fruit in which the fruit is passed over revolving rollers decreasing in diameter toward the discharge end; and it consists in the improved construction and combination of parts of such a machine, and more particularly of the means for rotating said rollers, as hereinafter more fully described and claimed.

In the accompanying drawings, the numeral 1 indicates the frame of the machine, to one end of which is secured a receiving-table, 2, an inclined grate, 3, and a picking-table, 4. Between the lower edge of the picking-table and the discharge end of the frame are journaled a series of inclined rollers, 5, formed in sections of successively-decreasing diameters toward the lower ends. These rollers are arranged in pairs, the upper ends of which engage with each other by means of frictional contact, except the two outside rollers, which revolve independently. Above each pair of rollers is placed a strip or shield, 6, extending from the lower edge of the table 4 to the discharge end of the frame.

Journaled to the upper end of the frame underneath the picking-table is a large wheel or pulley, 7, which can be operated by hand or other power. A belt, H, passes over this pulley, around and over one of the outside rollers, and alternately over and under one of the rollers of each pair of rollers, over an idle-wheel, 9, secured to the frame above and near to the opposite outside roller, and down upon the inner side of said roller. As the wheel 7 is revolved in the direction indicated by the arrow, motion is communicated to the outside rollers and to the pairs of rollers in such a manner that the rollers not in contact with each other will turn inward toward the open space and downward.

The fruit is poured onto the receiving end of the table 2, from which it passes down over the grate 3, through which leaves, sticks, and other impurities will pass. From the grate the fruit passes onto and over the picking-table 4, where it is spread out sufficiently to enable an attendant to pick out all decayed and defective fruit, and also any trash that may have passed over the grate. From the picking-table the fruit passes onto the revolving rollers, the shields or strips 6 throwing it between the rollers of the different pairs. The smaller fruit will pass through the smaller spaces at the upper end of the rollers, while the larger fruit will pass down the succeeding sections until it finds a space large enough to pass through or passes off at the discharge end of the frame.

Secured to the under side of the frame by means of buttons 11 at the ends of inclined troughs or spouts 10 are receiving-sacks 12, into which the fruit passes from each of the different-sized spaces between the rollers. As the surfaces of the rollers are smooth, the fruit will not be caught between them and bruised as it is passed through, and by having all of them operated by the same band they will turn in unison.

I claim and desire to secure by Letters Patent of the United States—

In a fruit-assorting machine, the combination of rollers journaled longitudinally therein, said rollers having sections of successively-decreasing diameters toward one end and arranged in pairs, the upper ends of the rollers of each pair being in frictional contact, a drive-pulley and an idle-pulley journaled to one end of said frame, and a band passed over said pulleys and alternately over and under the end of one of the rollers in each pair and one of the outer rollers, and adapted to bear against the inner face of the opposite outer roller, substantially as described, and for the purpose set forth.

In testimony that I claim the foregoing as my own I have hereunto affixed my signature in presence of two witnesses.

WILLIAM R. PHILLIPS.

Witnesses:
LOUIS BAGGER,
GEORGE E. FRECH.